United States Patent
Luo et al.

(10) Patent No.: US 11,425,740 B2
(45) Date of Patent: Aug. 23, 2022

(54) METHOD AND DEVICE CAPABLE OF EXECUTING INSTRUCTIONS REMOTELY IN ACCORDANCE WITH MULTIPLE LOGIC UNITS

(71) Applicant: Micron Technology, Inc., Boise, ID (US)

(72) Inventors: Fa-Long Luo, San Jose, CA (US); Glen E. Hush, Boise, ID (US); Aaron P. Boehm, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 155 days.

(21) Appl. No.: 16/989,051

(22) Filed: Aug. 10, 2020

(65) Prior Publication Data

US 2020/0374901 A1    Nov. 26, 2020

Related U.S. Application Data

(63) Continuation of application No. 16/142,025, filed on Sep. 26, 2018, now Pat. No. 10,785,786.

(51) Int. Cl.
*H04W 72/04* (2009.01)
*H04W 72/12* (2009.01)
(Continued)

(52) U.S. Cl.
CPC ...... *H04W 72/1263* (2013.01); *G06F 9/3001* (2013.01); *H04B 1/38* (2013.01);
(Continued)

(58) Field of Classification Search
CPC ....... H04W 72/1263; H04W 72/12289; H04W 84/042; H04W 92/18; H04W 72/1278;
(Continued)

(56) References Cited

U.S. PATENT DOCUMENTS 7,917,599 B1    3/2011    Gopalan et al.
8,306,525 B2    11/2012    Feher
(Continued)

OTHER PUBLICATIONS

Choi, et al. "A Remote Memory System for High Performance Data Processing", International Journal of Future Computer and Communications, vol. 4, No. 1, Feb. 2015, 5 pp.
(Continued)

*Primary Examiner* — Mewale A Ambaye
(74) *Attorney, Agent, or Firm* — Brooks, Cameron & Huebsch, PLLC

(57) ABSTRACT

Systems, apparatuses and method related to remotely executable instructions are described. A device may be wirelessly coupled to (e.g., physically separated) another device, which may be in a physically separate device. The another device may remotely execute instructions associated with performing various operations, which would have been entirely executed at the device absent the another device. The outputs obtained as a result of the execution may be transmitted, via the transceiver, back to the device via a wireless communication link (e.g., using resources of an ultra high frequency (UHF), super high frequency (SHF), extremely high frequency (EHF), and/or tremendously high frequency (THF) bands). The another device at which the instructions are remotely executable may include memory resources, processing resources, and transceiver resources; they may be configured to use one or several communication protocols over licensed or shared frequency spectrum bands, directly (e.g., device-to-device) or indirectly (e.g., via a base station).

18 Claims, 3 Drawing Sheets

(51) Int. Cl.
*H04B 1/38* (2015.01)
*G06F 9/30* (2018.01)
*H04W 92/18* (2009.01)
*H04W 84/04* (2009.01)

(52) U.S. Cl.
CPC ...... *H04W 72/1289* (2013.01); *H04W 84/042* (2013.01); *H04W 92/18* (2013.01)

(58) Field of Classification Search
CPC ........ H04W 72/14; G06F 9/3001; G06F 7/57; H04B 1/38; H04B 1/034
See application file for complete search history.

(56) References Cited

U.S. PATENT DOCUMENTS

| | | | |
|---|---|---|---|
| 9,497,572 | B2 | 11/2016 | Britt et al. |
| 2009/0144388 | A1 | 6/2009 | Gross et al. |
| 2011/0038378 | A1 | 2/2011 | Carter |
| 2017/0052906 | A1* | 2/2017 | Lea ...................... G06F 21/126 |
| 2018/0106618 | A1 | 4/2018 | Cerchio |
| 2018/0288152 | A1 | 10/2018 | Chagam Reddy |
| 2018/0308207 | A1* | 10/2018 | Appu .................... G06T 15/005 |
| 2018/0310237 | A1* | 10/2018 | Kumar .................... H04W 4/02 |
| 2018/0368115 | A1* | 12/2018 | Li ........................ H04W 72/042 |
| 2019/0045498 | A1 | 2/2019 | Huang |
| 2019/0182179 | A1* | 6/2019 | Pak ........................ H04L 49/10 |
| 2019/0253955 | A1 | 8/2019 | Abedini |
| 2019/0254009 | A1* | 8/2019 | Hwang ............ H04W 72/0453 |
| 2019/0354506 | A1 | 11/2019 | Bruner |
| 2020/0007414 | A1* | 1/2020 | Smith .................... H04L 67/12 |
| 2020/0008044 | A1* | 1/2020 | Poornachandran ... H04W 16/18 |
| 2020/0097331 | A1* | 3/2020 | Boehm ................ G06F 9/5061 |
| 2020/0100270 | A1* | 3/2020 | Luo .......................... H04B 1/38 |

OTHER PUBLICATIONS

"5G Network Architecture—A High-Level Perspective" Huawei Technologies, Co., Ltd., Bantian Longgang District, Shenzhen, China, 2016, 21 pp.

* cited by examiner

540 ⇾

```
┌─────────────────────────────────────────────────────┐
│ EXECUTING, RESPONSIVE TO RECEIPT OF A REQUEST       │
│ FROM A NETWORK DEVICE, A SET OF INSTRUCTIONS        │─ 542
│ USING A LOGIC UNIT ON A PROCESSOR COUPLED TO MEMORY │
└─────────────────────────────────────────────────────┘
```

```
┌─────────────────────────────────────────────────────────┐
│ TRANSMITTING, USING A TRANSCEIVER COUPLED TO THE PROCESSOR, │
│ AN OUTPUT THAT IS BASED AT LEAST IN PART ON THE EXECUTION   │
│ OF THE SET OF INSTRUCTION TO THE NETWORK DEVICE VIA         │─ 544
│ A COMMUNICATION LINK IN AT LEAST ONE OF A NUMBER OF         │
│ FREQUENCY BANDS INCLUDING AN EHF BAND                       │
└─────────────────────────────────────────────────────────┘
```

```
┌─────────────────────────────────────────────────────────────┐
│ EXECUTING, USING A LOGIC UNIT ON A PROCESSOR COUPLED TO     │
│ MEMORY AND A TRANSCEIVER, A PLURALITY OF SETS OF            │
│ INSTRUCTIONS CORRESPONDING TO A PLURALITY OF COMMANDS,      │─ 652
│ WHEREIN THE PLURALITY OF COMMANDS INCLUDES A                │
│ FIRST COMMAND RECEIVED FROM A FIRST NETWORK DEVICE AND      │
│ A SECOND COMMAND RECEIVED FROM A SECOND NETWORK DEVICE      │
└─────────────────────────────────────────────────────────────┘
```

```
┌─────────────────────────────────────────────────────┐
│ TRANSMITTING, TO THE FIRST NETWORK DEVICE,          │
│ A FIRST OUTPUT THAT IS BASED AT LEAST IN PART ON    │─ 654
│ EXECUTING A SET OF INSTRUCTIONS CORRESPONDING TO    │
│ THE FIRST COMMAND VIA A FIRST COMMUNICATION TECHNOLOGY │
└─────────────────────────────────────────────────────┘
```

```
┌─────────────────────────────────────────────────────┐
│ TRANSMITTING, TO THE SECOND NETWORK DEVICE,         │
│ A SECOND OUTPUT THAT IS BASED AT LEAST IN PART ON   │─ 656
│ EXECUTING A SET OF INSTRUCTIONS CORRESPONDING TO    │
│ THE SECOND COMMAND VIA A SECOND COMMUNICATION TECHNOLOGY │
└─────────────────────────────────────────────────────┘
```

*Fig. 6*

METHOD AND DEVICE CAPABLE OF EXECUTING INSTRUCTIONS REMOTELY IN ACCORDANCE WITH MULTIPLE LOGIC UNITS

PRIORITY INFORMATION

This application is a Continuation of U.S. application Ser. No. 16/142,025, filed Sep. 26, 2018, the contents of which are incorporated herein by reference.

TECHNICAL FIELD

The present disclosure relates generally to semiconductor memory and methods, and more particularly, to apparatuses, systems, and methods for remotely executable instructions.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random access memory (DRAM), static random access memory (SRAM), synchronous dynamic random access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random access memory (RRAM), ferroelectric random access memory (FeRAM), and magnetoresistive random access memory (MRAM), such as spin torque transfer random access memory (STT RAM), among other types.

Electronic systems often include a number of processors (e.g., one or more processors), which may retrieve instructions from a suitable location and execute the instructions and/or store results of the executed instructions to a suitable location (e.g., the memory resources). A processor can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., NOT) logical operations on data (e.g., one or more operands). For example, functional unit circuitry may be used to perform arithmetic operations such as addition, subtraction, multiplication, and division on operands via a number of operations.

BRIEF DESCRIPTION OF THE DRAWINGS

FIG. 5 is a flow chart illustrating an example of a method for remotely executing instructions in accordance with a number of embodiments of the present disclosure.

FIG. 6 is a flow chart illustrating an example of a method for remotely executing instructions in accordance with a number of embodiments of the present disclosure.

DETAILED DESCRIPTION

Figure 1:
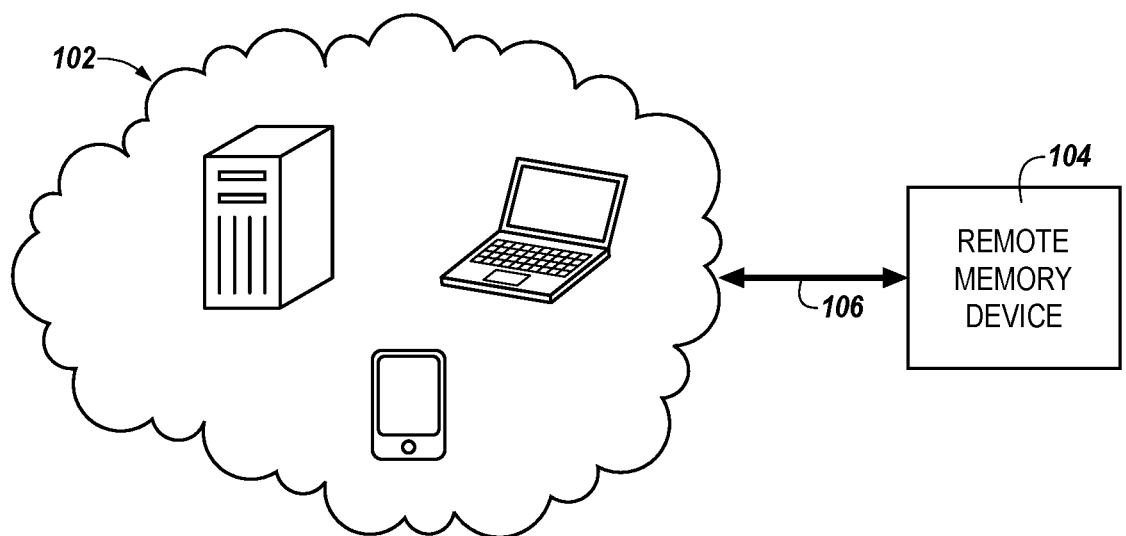
FIG. 1 is a diagram illustrating an example system including a remote memory device capable of executing instructions remotely in accordance with a number of embodiments of the present disclosure.

The present disclosure includes systems, apparatuses, and methods associated with remotely executable instructions. A device may be wirelessly (thus, remotely) coupled to (e.g., physically separated) another device, which may be in a physically separate device. The another device may remotely execute instructions associated with performing various operations, which would have been entirely executed at the device absent the another device. The outputs obtained as a result of the execution may be transmitted, via the transceiver, back to the device via a wireless communication link (e.g., using resources of an ultra high frequency (UHF), super high frequency (SHF), extremely high frequency (EHF), and/or tremendously high frequency (THF) bands). The another device at which the instructions are remotely executable may include memory resources, processing resources, and transceiver resources; they may be configured to use one or several communication protocols over licensed or shared frequency spectrum bands, directly (e.g., device-to-device) or indirectly (e.g., via a base station). In a number of embodiments, an apparatus includes a memory resource, a transceiver, and a processor coupled to the memory resource and the transceiver. The processor may be configured to communicate, using the transceiver, an output obtained as a result of an execution of a set of instructions via a device-to-device communication technology that is operable in an extremely high frequency (EHF) band.

A computing device may be utilized to perform various types of operations. To contribute to such performance, a faster processor and/or more memory resources may be additionally added to a particular computing device. Those additional resources may be internal and/or external to the particular computing device. A computing device can be a network device. As used herein, "network device" refers to a computing device that is configured to transmit and/or receive signals (e.g., data) and to process the received signals. For example, network devices may include data processing equipment such as a computer, cellular phone, personal digital assistant, tablet devices, an access point (AP), data transfer devices such as network switches, routers, controllers, although embodiments are not so limited.

In some approaches, those additional resources may exhaust, when physically added to the computing device, a substantial portion of bandwidth and/or power supplies of the computing device, which would reduce an overall performance of the computing device such that cost associated with utilizing the additional resources may outweigh benefits obtainable from utilizing the additional resources. Further, physical data buses connecting the computing device and additional resources may substantially limit a performance of the additional resources that can be provided to the computing device, for example, when a transfer rate the data buses can withstand is less than a degree of performance that can be provided by the additional resources (e.g., bottleneck issues). Accordingly, embodiments of the present disclosure are directed to having resources that can be utilized in a way that reduces a power consumption of the computing devices and in a way that fully utilizes performances of the resources without being bound to a limitation that can be imposed by physically connecting the resources to the computing devices.

The figures herein follow a numbering convention in which the first digit or digits of a reference number correspond to the figure number and the remaining digits identify an element or component in the figure. Similar elements or components between different figures may be identified by the use of similar digits. For example, 102 may reference element "02" in FIG. 1, and a similar element may be referenced as 402 in FIG. 4.

FIG. 1 is a diagram illustrating an example system 100 including a remote memory device 104 capable of executing instructions remotely in accordance with a number of embodiments of the present disclosure. The system also includes network devices 102. Each one of the network devices 102 and the remote memory device 104 might also be separately considered as an "apparatus." For example, the remote memory device may be considered as a remote apparatus to the network devices, vice versa.

At least one of the network devices 102 may be a computing device or portion thereof. Network devices may include user equipment (UE) such as cellular phones, laptop computers, tablets, phablets, and smartphones, as well as IoT enabled devices, and other electronic devices. As used herein, "IoT enabled devices" include physical devices, vehicles, home appliances, and other devices embedded with electronics, software, sensors, actuators, and/or network connectivity which enables such devices to connect to a network and/or exchange data. Examples of IoT enabled devices include wearable technologies, smart home devices, intelligent shopping systems, and monitoring devices, among other cyber-physical systems.

The remote memory device 104 can include at least one of a number of resources such as a processing resource, a memory resource, and/or a transceiver resource that can be remotely utilized by the network devices 102. As an example, the network devices 102 may allocate a portion of instructions (e.g., that would have been executed by the network devices absent the remote memory device 104), and the portion of allocation instructions may be executed at the remote memory device 104 without further exhausting resources of the network device 102. As used herein, the instructions are "remotely" executed at a remote memory device (e.g., remote memory device 104) when at least a portion of data values associated with the instructions are wirelessly transmitted from a network device (e.g., network device 102) to the remote memory device and executed at the remote memory device. Details of types of instructions/ operations remotely executable and performable at the remote memory device 104 are described further herein.

In some embodiments, the remote memory device 104 can also be utilized as a main memory such that the network device 102 need not have the main memory within the network device 102. As used herein, "a main memory" refers to a memory portion that is directly accessible by a host. As an example, the main memory may store data that can be directly manipulated by a host processor.

The remote memory device 104 can be remotely/wirelessly utilizable by the network devices 102 via a communication 106. For example, in response to receipt of a request (e.g., one or more commands to perform a particular function) from the network devices 102, the remote memory device 104 may execute a set of instructions and communicate an output obtained as a result of (e.g., that is based at least in part on) the execution. The remote memory device 104 may be utilized as if the remote memory device 104 were local to the network devices 102 without a need to be internal to and/or wired to the network devices 102. Accordingly, a number of embodiments of the present disclosure may provide mechanisms of remotely executing a set of instructions that would have exhausted bandwidths and/or power consumption of the network device 102 had the set of instructions been executed by a number of electrical components that are internal to and/or wired to the network device 102.

Further, the remote memory device 104 may be utilized by the network devices 102 via a device-to-device communication technology that is operable in an EHF band. The communication technology operable in the EHF band can include a fifth generation (5G) technology or later technology. 5G technology may be designed to utilize a higher frequency portion of the wireless spectrum, including an EHF band (e.g., ranging from 30 to 300 GHz as designated by the ITU).

As used herein, the device-to-device communication technology refers to a wireless communication performed directly between a transmitting device and a receiving device, as compared to a wireless communication technology such as the cellular telecommunication technology and/or those communication technologies based on an infrastructure mode, by which network devices communicate with each other by firstly going through an intermediate network device (e.g., base station and/or Access Point (AP)). As such, via the device-to-device communication technology, data to be transmitted by the transmitting device may be directly transmitted to the receiving device without routing through the intermediate network device (e.g., base station 429, as described in connection with FIG. 4). In some embodiments. the device-to-device communication may rely on existing infrastructures (e.g., network entity such as a base station); therefore, can be an infrastructure mode. For example, as described herein, the device-to-device communication whose transmission timing is scheduled by a base station can be an infrastructure mode. In some embodiments, the receiving and transmitting devices may communicate in the absent of the existing infrastructures; therefore, can be an ad-hoc mode. As used herein, "an infrastructure mode" refers to an 802.11 networking framework in which devices communicate with each other by first going through an intermediary device such as an AP. As used herein, "ad-hoc mode" refers to an 802-11 networking framework in which devices communicate with each other without the use of intermediary devices such as an AP. The term "ad-hoc mode" can also be referred to as "peer-to-peer mode" or "independent Basic Service Set (IBSS)."

As used herein, the cellular telecommunication technology refers to a technology for wireless communication performed indirectly between a transmitting device and a receiving device via a base station, as compared to those types of wireless communication technologies including a device-to-device communication technology. Cellular telecommunications may be those that use resources of a frequency spectrum restricted or regulated by a governmental entity. License frequency spectrum resources may be scheduled for use or access by certain devices and may be inaccessible to other devices. By contrast, resources of shared or unlicensed frequency spectrum may be open and available for use by many devices without the necessity of a governmental license. Allocating licensed and shared or unlicensed frequency resources may present different technical challenges. In the case of licensed frequency spectrum, resources may be controlled by a central entity, such as a base station or entity within a core network. While devices using resources of shared or unlicensed frequency spectrum may contend for access—e.g., one device may wait until a communication channel is clear or unused before transmitting on that channel. Sharing resources may allow for broader utilization at the expense of guaranteed access.

Techniques described herein may account for, or may use, both licensed and unlicensed frequency spectrum. In some communication schemes, device-to-device communication may occur on resources of a licensed frequency spectrum, and such communications may be scheduled by a network entity (e.g., a base station). Such schemes may include certain 3GPP-developed protocols, like Long-Term Evolution (LTE) or New Radio (NR). A communication link between devices (e.g. UEs) in such schemes may be referred to as sidelink, while a communication link from a base station to a device may be referred to as a downlink and a communication from a device to a base station may be referred to as an uplink.

In other schemes, device-to-device communication may occur on resources of unlicensed frequency spectrum, and devices may contend for access the communication channel or medium. Such schemes may include WiFi or MulteFire. Hybrid schemes, including licensed-assisted access (LAA) may also be employed.

As used herein, an EHF band refers to a band of radio frequencies in an electromagnetic spectrum ranging from 30 to 300 gigahertz (GHz) as designated by the International Telecommunication Union (ITU), and as described further herein. Ranges of radio frequencies as designated by the ITU can include extremely low frequency (ELF) band ranging from 3 to 30 Hz, super low frequency (SLF) band ranging from 30 Hz to 300 Hz, ultra low frequency (ULF) band ranging from 300 Hz to 3 kilohertz (kHz), very low frequency (VLF) band ranging from 3 to 30 kHz, low frequency (LF) band ranging from 30 kHz to 300 kHz, medium frequency (MF) band ranging from 300 kHz to 3 megahertz (MHz), high frequency (HF) band ranging from 3 MHz to 30 MHz, very high frequency (VHF) band ranging from 30 MHz to 300 MHz, ultra high frequency (UHF) band ranging from 300 MHz to 3 GHz, super high frequency (SHF) band ranging from 3 GHz to 30 GHz, extremely high frequency (EHF) band ranging from 30 GHz to 300 GHz, and tremendously high frequency (THF) band ranging from 0.3 to 3 terahertz (THz).

A number of embodiments of the present disclosure can provide various benefits by utilizing a network communication that is operable in a number of frequency bands including a higher frequency portion (e.g., EHF) of the wireless spectrum, as compared to those network communication technologies that utilizes a lower frequency portion of the wireless spectrum only. As an example, the EHF bands of 5G technology may enable data to be transferred more rapidly than technologies (e.g., including technologies of previous generations) using lower frequency bands only. For example, a 5G network is estimated to have transfer speeds up to hundreds of times faster than a 4G network, which may enable data transfer rates in a range of tens of megabits per second (MB/s) to tens of GB/s for tens of thousands of users at a time (e.g., in a memory pool, as described herein) by providing a high bandwidth. For example, a 5G network provides faster transfer rates than the 802.11-based network such as WiFi that operate on unlicensed 2.4 GHz radio frequency band (e.g., Ultra High Frequency (UHF) band). Accordingly, a number of embodiments can enable the remote memory device 104 to be used at a high transfer speed as if the remote memory device 104 were wired to the network devices 102.

In addition to the EHF band, the communication technology of the communication 106 can also be operable in other frequency bands such as the UHF band and the SHF band. As an example, the communication technology can operate in a frequency band below 2 GHz (e.g., low 5G frequencies) and/or in a frequency band between 2 GHz and 6 GHz (e.g., medium 5G frequencies) in addition to a frequency band above 6 GHz (e.g., high 5G frequencies). Further details of a number of frequency bands (e.g., below 6 GHz) in which the 5G technology can operate are defined in Release 15 of the Third Generation Partnership Project (3GPP) as New Radio (NR) Frequency Range 1 (FR1), as shown in Table 1.

TABLE 1

5G operating bands for FR1

| NR Operating Band | Frequency Band (MHz) | Duplex Mode |
|---|---|---|
| n1 | 1920-1980; 2110-2170 | FDD |
| n2 | 1850-1910; 1930-1990 | FDD |
| n3 | 1710-1785; 1805-1880 | FDD |
| n5 | 824-849; 869-894 | FDD |
| n7 | 2500-2570; 2620-2690 | FDD |
| n8 | 880-915; 925-960 | FDD |
| n20 | 791-821; 832-862 | FDD |
| n28 | 703-748; 758-803 | FDD |
| n38 | 2570-2620 | TDD |
| n41 | 2496-2690 | TDD |
| n50 | 1432-1517 | TDD |
| n51 | 1427-1432 | TDD |
| n66 | 1710-1780; 2110-2200 | FDD |
| n70 | 1695-1710; 1995-2020 | FDD |
| n71 | 617-652; 663-698 | FDD |
| n74 | 1427-1470; 1475-1518 | FDD |
| n75 | 1432-1517 | SDL |
| n76 | 1427-1432 | SDL |
| n78 | 3300-3800 | TDD |
| n77 | 3300-4200 | TDD |
| n79 | 4400-5000 | TDD |
| n80 | 1710-1785 | SUL |
| n81 | 880-915 | SUL |
| n82 | 832-862 | SUL |
| n83 | 703-748 | SUL |
| n84 | 1920-1980 | SUL |

Further, details of a number of frequency bands (e.g., above 6 GHz) in which the 5G technology can operate are defined in Release 15 of the 3GPP as NR Frequency Range 2 (FR2), as shown in Table 2.

TABLE 2

5G operating bands for FR2

| NR Operating Band | FREQUENCY BAND (MHz) | Duplex Mode |
|---|---|---|
| n257 | 26500-29500 | TDD |
| n258 | 24250-27500 | TDD |
| n260 | 37000-40000 | TDD |

In some embodiments, a number of frequency bands in which a communication technology (e.g., device-to-device communication technology and/or cellular telecommunication technology using 5G technology) utilized for the communication 106 may be operable can further include the THF band in addition to those frequency bands such as the SHF, UHF, and EHF bands.

As used herein, FDD stands for frequency division duplex, TDD stands for time division duplex, SUL stands for supplementary uplink, and SDL stands for supplementary downlink. FDD and TDD are each a particular type of a duplex communication system. As used herein, a duplex communication system refers to a point-to point system having two connected parties and/or devices that can communicate with one another in both directions. TDD refers to duplex communication links where uplink is separated from downlink by the allocation of different time slots in the same frequency band. FDD refers to a duplex communication system, in which a transmitter and receiver operate at different frequency bands. SUL/SDL refer to a point-to-point communication system having two connected parties and/or devices that can communicate with one another in a unilateral direction (e.g., either via an uplink or a downlink, but not both).

The 5G technology may be selectively operable in one or more of low, medium, and/or high 5G frequency bands based on characteristics of, for example, the communication 106. As an example, the low 5G frequency may be utilized in some use cases (e.g., enhanced mobile broadband (eMBB), ultra-reliable and low-latency communications (URLLC), massive machine-type communications (mMTC)), in which extremely wide area needs to be covered by the 5G technology. As an example, the medium 5G frequency may be utilized in some use cases (e.g., eMBB, URLLC, mMTC), in which higher data rate than that of the low 5G frequencies is desired for the communication technology. As an example, the high 5G frequency may be utilized in some use cases (e.g., eMBB), in which extremely high data rate is desired for the 5G technology.

As used herein, eMBB, URLLC, mMTC each refers to one of three categories of which the ITU has defined as services that the 5G technology can provide. As defined by the ITU, eMBB aims to meet the people's demand for an increasingly digital lifestyle and focuses on services that have high requirements for bandwidth, such as high definition (HD) videos, virtual reality (VR), and augmented reality (AR). As defined by the ITU, URLLC aims to meet expectations for the demanding digital industry and focuses on latency-sensitive services, such as assisted and automated driving, and remote management. As defined by the ITU, mMTC aims to meet demands for a further developed digital society and focuses on services that include high requirements for connection density, such as smart city and smart agriculture.

As used herein, a channel bandwidth refers to a frequency range occupied by data and/or instructions when being transmitted (e.g., by an individual carrier) over a particular frequency band. As an example, a channel bandwidth of 100 MHz may indicate a frequency range from 3700 MHZ to 3800 MHZ, which can be occupied by data and/or instructions when being transmitted over n77 frequency band, as shown in Table 1. As indicated in Release 15 of the 3GPP, a number of different channel bandwidth such as a channel bandwidth equal to or greater than 50 MHz (e.g., 50 MHz, 100 MHz, 200 MHz, and/or 400 Mhz) may be utilized for the 5G technology.

Embodiments are not limited to a particular communication technology; however, various types of communication technologies may be employed for the communication 106. The various types of communication technologies the network devices 102 and/or the remote memory device 104 can utilize may include, for example, cellular telecommunication technology including 0-5 generations broadband cellular network technologies, device-to-device to communication including Bluetooth, Zigbee, and/or 5G, and/or other wireless communication utilizing an intermediary device (e.g., WiFi utilizing an AP), although embodiments are not so limited.

Figure 2:
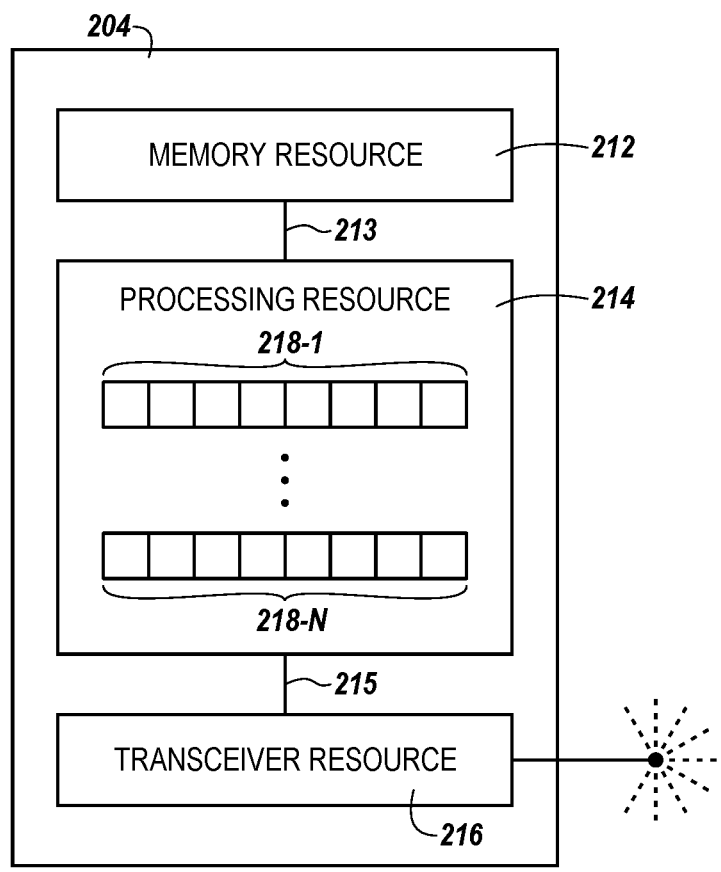
FIG. 2 is a schematic diagram illustrating an example remote memory device including a memory resource, a processing resource, and a transceiver resource in accordance with a number of embodiments of the present disclosure.

FIG. 2 is a schematic diagram illustrating an example remote memory device 204 including a memory resource 212, a processing resource 214, and a transceiver resource 216 in accordance with a number of embodiments of the present disclosure. The example remote memory device 204 (which can be also referred to as a remote apparatus) may be analogous to the remote memory device 104, as described in connection with FIG. 1. Although not shown in FIG. 2, the remote memory device 204 may be wirelessly coupled to a network device (e.g., network device 102 as described in connection with FIG. 1).

A memory resource 212 (which can be also referred to as "memory) may include memory (e.g., memory cells) arranged, for example, in a number of bank groups, banks, bank sections, subarrays, and/or rows of a number of memory devices. In some embodiments, the memory resource 212 of FIG. 2 may include a plurality of memory devices such as a number of volatile memory devices formed and/or operable as RAM, DRAM, SRAM, SDRAM, and/or TRAM, among other types of volatile memory devices. In some embodiments, the memory resource 212 of FIG. 2 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices. In some embodiments, the memory resource 212 of FIG. 2 may include a combination of a number of volatile memory devices and a number of non-volatile memory device, as described herein.

In some embodiments, the memory resource 212 of the remote memory device 204 may be a DRAM. As an example, the remote memory device 204 may be SDRAM such as a synchronous graphics RAM (SGRAM), which is a clock-synchronized random access memory that can be used for the video card.

Memory cells of the memory resource 212 may be configured to store data values associated with a number of instructions for performance of a particular functionality. In a number of embodiments, the memory resource 212 may be utilized, via the transceiver 216, by other network devices (e.g., network devices 102 and/or remote memory device 104) as if the memory resource 212 were local to a corresponding one of the other network devices.

As shown in FIG. 2, the processor 214 includes a plurality of sets of logic units 218-1, . . . , 218-N (collectively referred to as logic units 218). In a number of embodiments, the processor may be configured to execute a plurality of sets of instructions using the plurality of sets of logic units and transmit outputs obtained as a result of the execution via a device-to-device communication technology that is operable in a number of frequency bands including the EHF band. The outputs transmitted may be communicated with other devices such as network devices 102.

Although embodiments are not so limited, at least one of the logic units 218 can be an arithmetic logic unit (ALU), which is a circuit that can perform arithmetic and bitwise logic operations on integer binary numbers and/or floating point numbers. As an example, the ALU can be utilized to execute instructions by performing logical operations such as AND, OR, NOT, NAND, NOR, and XOR, and invert (e.g., inversion) logical operations on data (e.g., one or more operands). The processor 214 may also include other components that may utilized for controlling logic units 218. For example, the processor 214 may also include a control logic (e.g., configured to control a data flow coming into and out of the logic units 218) and/or a cache coupled to each of the plurality of set of logic units 218-1, . . . , 218-N A number of ALUs can be used to function as a floating point unit (FPU) and/or a graphics processing unit (GPU). Stated differently, at least one of the plurality of sets of logic units 218-1, . . . , 218-N may be FPU and/or GPU. As an example, the set of logic units 218-1 may be the FPU while the set of logic units 218-N may be the GPU.

As used herein, "FPU" refers to a specialized electronic circuit that operates on floating point numbers. In a number of embodiments, FPU can perform various operations such as addition, subtraction, multiplication, division, square root, and/or bit-shifting, although embodiments are not so limited. As used herein, "GPU" refers to a specialized electronic circuit that rapidly manipulate and alter memory (e.g., memory resource 212) to accelerate the creation of image in a frame buffer intended for output to a display. In a number of embodiments, GPU can include a number of logical operations on floating point numbers such that the GPU can perform, for example, a number of floating point operations in parallel.

In some embodiments, GPU can provide non-graphical operation. As an example, GPU can also be used to support shading, which is associated with manipulating vertices and textures with man of the same operations supported by CPUs, oversampling and interpolation techniques to reduce aliasing, and/or high-precision color spaces. These example operations that can be provided by the GPU are also associated with matrix and vector computations, which can be provided by GPU as non-graphical operations. As an example, GPU can also be used for computations associated with performing machine-learning algorithms and is capable of providing faster performance than what CPU is capable of providing. For example, in training a deep learning neural networks, GPUs can be 250 times faster than CPUs. As used herein, "machine-learning algorithms" refers to algorithms that uses statistical techniques to provide computing systems an ability to learn (e.g., progressively improve performance on a specific function) with data, without being explicitly programmed.

GPU can be present on various locations. For example, the GPU can be internal to (e.g., within) the CPU (e.g., of the network device 102). For example, the GPU can be on a same board (e.g., on-board unit) with the CPU without necessarily being internal to the GPU. For example, the GPU can be on a video card that is external to network device (e.g., network devices 102 as described in connection with FIG. 1). Accordingly, the remote memory device 204 may be an additional video card that can be external to and wirelessly coupled to a network device such as the network device 102 for graphical and/or non-graphical operations.

A number of GPUs of the processor 214 may accelerate a video decoding process. As an example, the video decoding process that can be accelerated by the processors 214 may include a motion compensation (mocomp), an inverse discrete cosine transform (iCDT), an inverse modified discrete cosine transform (iMDCT), an in-loop deblocking filter, an intra-frame prediction, an inverse quantization (IQ), a variable-length decoding (VLD), which is also referred to as a slice-level acceleration, a spatial-temporal deinterlacing, an automatic interlace/progressive source detection, a bitstream processing (e.g., context-adaptive variable-length coding and/or context-adaptive binary arithmetic coding), and/or a perfect pixel positioning. As used herein, "a video decoding" refers to a process of converting base-band and/or analog video signals to digital components video (e.g., raw digital video signal).

In some embodiments, the processor 214 may be further configured to perform a video encoding process, which converts digital video signals to analog video signals. For example, if the network device (including a display) requests the remote memory device 204 to return a specific form of signals such as the analog video signals, the remote memory device 204 may be configured to convert, via the processor 204, digital video signals to analog video signals prior to transmitting those wirelessly to the network device.

The remote memory device 204 includes the transceiver 216. As used herein, a "transceiver" may be referred to as a device including both a transmitter and a receiver. In a number of embodiments, the transceiver 216 may be and/or include a number of radio frequency (RF) transceivers. The transmitter and receiver may, in a number of embodiments, be combined and/or share common circuitry. In a number of embodiments, no circuitry may be common between the transmit and receive functions and the device may be termed a transmitter-receiver. Other devices consistent with the present disclosure may include transponders, transverters, and/or repeaters, among similar devices.

In a number of embodiments, a communication technology that the processor 214 can utilize may be a device-to-device communication technology as well as a cellular telecommunication technology, and the processor 214 may be configured to utilize the same transceiver (e.g., transceiver 216) for both technologies, which may provide various benefits such as reducing a design complexity of the remote memory device 204. As an example, consider devices (e.g., network devices and/or any other devices that may be analogous to the remote memory device 204) in previous approaches, in which the device utilizes a device-to-device communication technology as well as a cellular telecommunication technology in communicating with other devices. The device in those previous approaches may include at least two different transceivers (e.g., each for the device-to-device communication technology and the cellular telecommunication technology, respectively) because each type of communication technology may utilize different network protocols that would further necessarily utilize unique transceivers. As such, the device implemented with different transceivers would increase a design (e.g., structural) complexity that may increase costs associated with the device. On the other hand, in a number of embodiments, the processor 214 is configured to utilize the same network protocol for both technologies (e.g., device-to-device communication and cellular telecommunication technologies), which eliminates a need of having different transceivers for different types of wireless communication technologies. Accordingly, a number of the present disclosure may reduce a design complexity of the remote memory device 204.

In a number of embodiments, since resources of the remote memory device 204 can be remotely/wirelessly utilizable, the remote memory device 204 may be free of those physical interfaces that would have been included, to physically connect to a motherboard of a network device and/or a display, in expansion cards of previous approaches. For example, the remote memory device 204 as an expansion card may not include a physical interface, which would have been utilized to connect to the mother board, such as a physical bus (e.g., S-100 bus, industry standard architecture (ISA) bus, NuBus bus, Micro Channel bus (or Micro Channel Architecture (MCA), extended industry standard architecture (EISA) bus, VESA local bus (VLB), peripheral component interconnect (PCI) bus, ultra port architecture (UPA), universal serial bus (USB), peripheral component interconnect extended (PCI-X), peripheral component interconnect express (PCIe)) or other physical channels such as accelerated graphics port (AGP) that would have been utilized to connect to the motherboard. For example, the remote memory device 204 as an expansion card may not include a physical interface, which would have been utilized to connect to the display, such as a video graphics array (VGA), digital video interface (DVI), high-definition multimedia interface (HDMI), and/or display port. Accordingly, the remote memory device 204 may be configured to transmit, via the transceiver 216, those signals, which would have been transmitted by those physical interfaces listed above, wirelessly to the network device and/or display. For example, the signals that can be wirelessly transmitted via the transceiver 216 may include compressed and/or uncompressed digital video signals (that would have been transmitted by HDMI and/or VGA), compressed and/or uncompressed audio signals (that would have been transmitted by HDMI), and/or analog video signals (that would have been transmitted by VGA).

Figure 3:
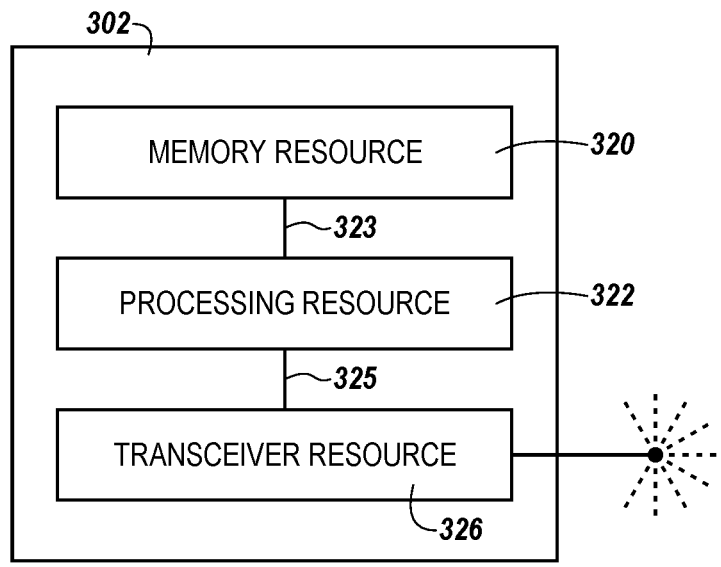
FIG. 3 is a schematic diagram illustrating an example network device including a memory resource, a processing resource, and a transceiver resource in accordance with a number of embodiments of the present disclosure.

FIG. 3 is a schematic diagram illustrating an example network device 302 including a memory resource 320, a processing resource 322, and a transceiver resource 326 in accordance with a number of embodiments of the present disclosure. The example network device 302 (which can be also referred to as an "apparatus") may be analogous to one of the network devices 102 and 202 (e.g., IoT device) described in connection with FIGS. 1 and 2, respectively. As described herein, network device 302 may include UEs such as cellular phones, laptop computers, tablets, phablets, and smartphones, as well as IoT enabled devices, and other electronic devices.

The memory resource 320 (which can be also referred to as "memory") may store instructions executable by the processing resource 322. The instructions stored in the memory resource 320 may be basic instructions directing the processing resource 322 for performing various functions. As an example, basic instructions executed by the processing resource 322 may cause the processing resource 322 to utilize a transceiver resource 326 to communicate with a remote memory device (e.g., remote memory device 204). In addition to the basic instructions, the memory resource 320 may also store instructions to perform graphical and/or non-graphical operations, as described in connection with FIG. 2. Since the memory resource 320 is physically located within the network device 302 and physically coupled to the processing resource 322, the memory resource 302 can be referred to as a "local memory" (e.g., of the network device 302) of the network device 302.

A processing resource 322 may be a CPU of the network device 302. As a CPU of the network device 302, the processing resource 322 may be configured to transmit a request and/or command to the remote memory device 204 and have the remote memory device 204 perform various operations (e.g., by executing a particular set of instructions) as requested. In some embodiments, operations (e.g., graphical and/or non-graphical) that can be remotely performed by the remote memory device 204 may also be performed by executing the instructions stored in the memory resource 320; however, by allocating, to the remote apparatus 201, a portion of instructions associated with performing the operations (e.g., that would have been entirely performed at the network device 320 absent the remote memory device 204), the resources such as the memory resource 320 and the processing resource 322 of the network device 302 may be offloaded from burdens of performing the entire operations. As used herein, "allocating" at least a portion of the instructions from the network device 302 to the remote memory device may include transmitting at least a portion of the instructions stored in the memory resource 320 wirelessly to the remote memory device and/or wirelessly transmitting a request to the remote memory device such that an instruction corresponding to the request can be executed at the remote memory device.

Although not shown in FIG. 3, the memory resource 320 may be coupled to the processing resource 322, for example, via a bus 323 for communicating data the memory resource 320 and the processing resource 322. For example, the processing resource 322 may request particular data values stored in the memory resource 320 and the data values may be retrieved from the memory resource 320 to the processing resource 322 via the bus 323. For example, the processing resource 322 may receive data values (e.g., outputs) from the remote memory device and send those data values to the memory resource 320 via the bus 323.

The processing resource 322 may be coupled to a transceiver resource 326 via bus 315 325. The transceiver resource 326 may be configured to wirelessly share data with other devices, and the processing resource 322 may be configured to communicate with a wireless main memory via the transceiver resource 326. As used herein, the terms "transceiver resource" and "transceiver" are used interchangeably herein and can have the same meaning, as appropriate to the context.

As used herein, a "transceiver" may be referred to as a device including both a transmitter and a receiver. In a number of embodiments, the transceiver resource 326 may be and/or include a number of radio frequency (RF) transceivers. The transmitter and receiver may, in a number of embodiments, be combined and/or share common circuitry. In a number of embodiments, no circuitry may be common between the transmitter and receiver and the device may be termed a transmitter-receiver. Other devices consistent with the present disclosure may include transponders, transverters, and/or repeaters, among similar devices.

As described in connection with FIG. 1, the network device 302 (e.g., processing resource 322) may be configured to communicate, via the transceiver resource 326, with other devices such as a remote memory device 204 via a communication that is operable in an EHF band. In a number of embodiments, a communication technology that can be utilized for communication between the network device 302 and the remote memory device 204 may be a device-to-device communication using 5G technology. Stated differently, 5G cellular telecommunication may also be in a form of a device-to-device communication, in which data are communicated directly between a transmitting device and a receiving device.

Implementing 5G technology in a form of a device-to-device communication may provide various benefits such as reducing a design complexity of an apparatus (e.g., network device 302 and/or remote memory device 204) and/or providing a network communication via which network device 302 may communicate with the remote memory device 204 as if the network device 320 were local (e.g., physically coupled) to the remote memory device 204. As an example, consider network devices in previous approaches, in which the network devices utilize a device-to-device communication as well as a cellular telecommunication that routes data firstly through an intermediary device (e.g., base station, AP, etc.). The network devices in those previous approaches may include at least two different transceivers (e.g., each for the device-to-device communication and the cellular telecommunication) because each type of communication may utilize different network protocols that would further necessarily utilize unique transceivers. As such, the network devices implemented with different transceivers would increase a design (e.g., structural) complexity that may increase costs associated with the network devices. On the other hand, a number of embodiments of the present disclosure may reduce a design complexity of the network device 302 (e.g., network device) by eliminating a need of having different transceivers for different types of network communication technologies such as a device-to-device communication and a cellular telecommunication. Instead, the network device 302 can have an individual transceiver for different types of network communication technologies, which would reduce a structural complexity of the network device 302; thereby, reducing cost associated with the network device 302.

In some examples, the transceiver resource 326 may be wirelessly couplable to a base station (e.g., base station 429 as illustrated in and described in connection with FIG. 5). As used herein, "a base station" refers to a land station (e.g., including a telecommunication tower) in a mobile service (e.g., according to ITU Radio Regulations). The term may be used in the context of mobile telephony, wireless computer networking, and/or other wireless communications, as further described in connection with FIG. 5.

Figure 4:
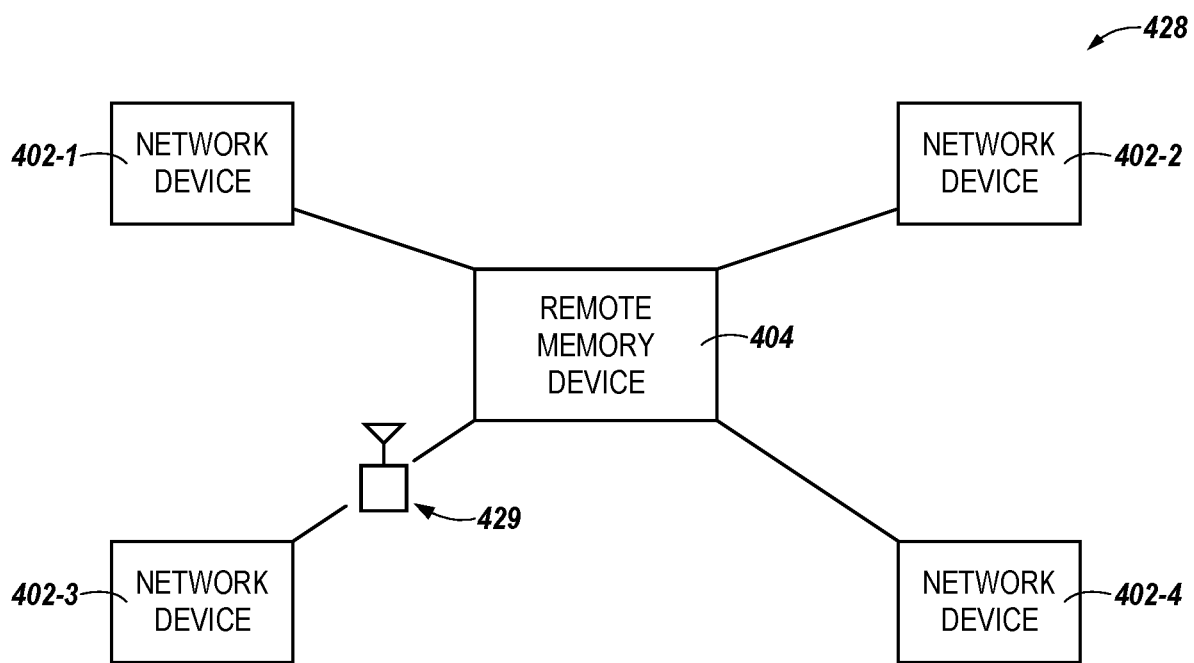
FIG. 4 is a block diagram of an example of a system including a remote memory device in accordance with a number of embodiments of the present disclosure.

FIG. 4 is a block diagram of examples of a system 428 including a remote memory device 404 in accordance with a number of embodiments of the present disclosure. As illustrated in FIG. 4, the system 428 may, in a number of embodiments, include a plurality of elements. For example, the plurality of elements of the system 428 may be a number of network devices 402-1, 402-2, 402-3, and 402-4 (collectively referred to as network devices 402), an remote memory device 404, and/or a base station 429. At least a portion of the network devices 402 may include a local commodity DRAM and may utilize the resources of the remote memory device 404 as supplemental resources. The remote memory device 404 includes resources (e.g., a memory resource, a transceiver, and/or a processor) at least of which can be remotely/wirelessly utilizable (e.g., shared) by the network devices 402.

The network devices 402 can be various user devices. As an example, the network devices 402 can be computing devices such as laptops, phones, tablets, desktops, wearable smart devices, etc. In some embodiments, the user devices may be mobile as well. As used herein, a "mobile user device" may be a device that is portable and utilizes a portable power supply. In a number of embodiments, the network devices 402 can include a local DRAM and a memory resource that can be included in the remote memory device 404 and utilizable by the network devices 402 may be supplemental to the network devices 402.

The remote memory device 404 can be a wireless electronic component of at least one of the network devices 402. As used herein, "an electronic component" refers to an electronic component that can provide additional functions to a network device and/or assist the network device in furthering a particular function. For example, an electronic component may include various types of components (e.g., expansion card) such as a video card, sound card, primary storage devices (e.g., main memory), and/or secondary (auxiliary) storage devices (e.g., flash memory, optical discs, magnetic disk, and/or magnetic tapes), although embodiments are not so limited. As used herein, "a wireless electronic component" refers to an electronic component that is wirelessly coupled to a network device.

Accordingly, as an example, the remote memory device 404 may be wirelessly utilized by the network devices 402 for various functions. As an example, the remote memory device 404 may be utilized for graphical operations that would require high-performance processing and/or memory resources such as memory intensive games and/or high quality video associated with a high degree of resolutions and/or frame rates. Further, as an example, the remote memory device 404 may be utilized for non-graphical operations such as a number of operations of applications associated with machine-learning algorithms that would require high-performance processing and/or memory resources.

In some embodiments, at least a portion of the network devices 402 may be a small form factor (SFF) device such as a handheld computing device (e.g., personal computer (PC)). A degree of performance that can be often provided by the SSF device can be relatively low due to its limited size and volume. Further, the SSF device may lack a number of channels by which expansion cards such as a high-performance video card can be added. Accordingly, providing a mechanism to wirelessly add a high-performance video card such as the remote memory device 404 to the SSF device can provide benefits such as performing, at the SSF device, memory-intensive operations (e.g., memory intensive games and/or high quality video associated with a high degree of resolutions and/or frame rates), which would have not been properly performed at the SSF device absent the wirelessly utilizable resources.

In a number of embodiments, the remote memory device 404 may be wirelessly utilized via a device-to-device communication technology, for example, by the network devices 402-1, 402-2, and/or 402-4 as shown in FIG. 4. For example, as illustrated in connection with FIG. 2, the device-to-device communication technology can operate in higher frequency portion of the wireless spectrum, including an UHF, SHF, EHF and/or THF band, as defined according to the ITU. However, embodiments are not so limited. For example, other network communication technologies of a device-to-device communication technology may be employed within the system 428. As an example, the remote memory device 404 may communicate with at least one of the network devices 402-1, 402-2, and/or 402-4 via a different type of device-to-device communication technology such as a Bluetooth, Zigbee, and/or other types of device-to-device communication technologies.

As shown in FIG. 4, the remote memory device 404 may be wirelessly utilized by the network device 402-3 via the base station 429. As an example, a communication technology that can be utilized between the network device 402-3 and the remote memory device 404 may be a cellular telecommunication technology. In a number of embodiments, the cellular telecommunication technology that can be utilized for communicating between the network device 402-3 and the remote memory device 404 can include a 5G cellular telecommunication technology that operates in at least one of a number of frequency bands including the UHF, SHF, EHF, and/or THF.

The term "base station" may be used in the context of mobile telephony, wireless computer networking and/or other wireless communications. As an example, a base station 429 may include a GPS receiver at a known position, while in wireless communications it may include a transceiver connecting a number of other devices to one another and/or to a wider area. As an example, in mobile telephony, a base station 429 may provide a connection between mobile phones and the wider telephone network. As an example, in a computing network, a base station 429 may include a transceiver acting as a router for electrical components (e.g., memory resource 212 and processor 214) in a network, possibly connecting them to a WAN, WLAN, the Internet, and/or the cloud. For wireless networking, a base station 429 may include a radio transceiver that may serve as a hub of a local wireless network. As an example, a base station 429 also may be a gateway between a wired network and the wireless network. As an example, a base station 429 may be a wireless communications station installed at a fixed location.

In a number of embodiments, the remote memory device 404 may utilize the same network protocol and same transceiver (e.g., RF transceiver) for a device-to-device communication technology (e.g., 5G device-to-device communication technology) as well as a cellular telecommunication technology (e.g., 5G cellular telecommunication technology), as described in connection with FIG. 2. As an example, the remote memory device 404 may utilize the same network protocol in communicating with the network device 402-3 (e.g., via a cellular telecommunication technology through the base station 429) as well as with the network devices 402-1, 402-2, and/or 402-4 (e.g., via a device-to-device communication technology).

In a number of embodiments, various types of network protocols may be utilized for communicating data within the system 428 (e.g., among the network devices 402, between the network devices 402 and the wireless memory device, between the network devices 402 and the base station 429, etc.). The various types of network protocols may include the time-division multiple access (TDMA), code-division multiple access (CDMA), space-division multiple access (SDMA), frequency division multiple access (FDMA), orthogonal FDMA (OFDMA), single-carrier (SC)-FDMA, and/or non-orthogonal multiple access (NOMA), although embodiments are not so limited.

In some embodiments, cellular telecommunication technologies (e.g., between the remote memory device 404 and the network device 402-3) may be performed via (e.g., include) a NOMA. As used herein, the NOMA refers to a network protocol that separates signals according to a power domain. For example, signals may be received (e.g., from the user) in an intentionally-introduced mutual interference and can be separated from each other according to differences on their power levels. As such, the signals received and to be processed pursuant to the NOMA may be non-orthogonal in time, frequency, and/or code, as compared to those orthogonal multiple-access (OMA) schemes, in which different users are allocated according to orthogonal resources, either in time, frequency, and/or code domain. Accordingly, utilizing a non-orthogonal network protocols such as the NOMA may provide benefits such as reduced latencies associated with separating users based on factors other than power domain, which may enable massive Multiple Input Multiple Output (MIMO).

In a number of embodiments, the remote memory device 404 may be utilized by the network devices 402 at a discrete time. For example, the remote memory device 404 may be utilized by the network device 402-2 during a subsequent period of a particular period during which the remote memory device 404 was, for example, utilized by the network device 402-1. As such, the remote memory device 404 may be utilized by each of the network devices 402 at different times (e.g., non-overlapping time periods). However, embodiments are not so limited. For example, the remote memory device 404 may be simultaneously utilized by the network devices 402. As an example, the remote memory device 404 may be physically and/or logically partitioned such that the partitioned portions may be simultaneously utilized by the network devices 402.

FIG. 5 is a flow chart illustrating an example of a method 540 for remotely executing instructions in accordance with a number of embodiments of the present disclosure. The network device may be analogous to the network devices 102, 302, and 402, as described in connection with FIGS. 1 and 3. Unless explicitly stated, elements of methods described herein are not constrained to a particular order or sequence. Additionally, a number of the method embodiments, or elements thereof, described herein may be performed at the same, or at substantially the same, point in time.

At block 542, the method 540 may include executing, responsive to receipt of a request from a network device, a set of instructions using a logic unit on a processor coupled to memory. In some embodiments, the method 540 may include utilizing, to communicate with the network device, a channel bandwidth equal to or greater than 50 megahertz (MHz). At block 544, the method 540 may include transmitting, using a transceiver coupled to the processor, an output that is based at least in part on the execution of the set of instruction to the network device via a communication link in at least one of a number of frequency bands including an EHF band.

In a number of embodiments, the 5G technology or later technology may be employed for the communication link. As described herein, the 5G technology or later technology may operate in a number of frequency bands including the UHF, SHF, EHF, and/or THF bands, as described in connection with FIG. 2. The memory, transceiver, and/or the processor may be a resource that can be wirelessly utilizable by the first network device and/or the second network device via respective communication technologies such as 5G technology.

In some embodiments, the method 540 may further include selecting one of the number of frequency bands based on a communication characteristic of a communication between the processor and the network device. The communication characteristic between the processor and the network device may include a distance between the processor and the network device.

FIG. 6 is a flow chart illustrating another example of a method 650 for remotely executing instructions in accordance with a number of embodiments of the present disclosure. Unless explicitly stated, elements of methods described herein are not constrained to a particular order or sequence. Additionally, a number of the method embodiments, or elements thereof, described herein may be performed at the same, or at substantially the same, point in time.

At block 652, the method 650 may include executing, using a logic unit on a processor coupled to memory and a transceiver resource, a plurality of sets of instructions corresponding to a plurality of commands, wherein the plurality of commands includes a first command received from a first network device and a second command received from a second network device. The first network device and/or the second network device may be analogous to the network devices 102 and 402, as described in connection with FIGS. 1 and 3. At block 654, the method 650 may include transmitting, to the first network device, a first output that is based at least in part on executing a set of instructions corresponding to the first command via a first communication technology. At block 656, the method 650 may include transmitting, to the second network device, a second output that is based at least in part on executing a set of instructions corresponding to the second command via a second communication technology.

In some embodiments, the first communication technology can include a device-to-device communication technology and the second communication technology can include a cellular communication technology. In this example, the method 650 may include utilizing a same network protocol and/or a same transceiver for the first communication technology (e.g., device-to-device communication technology) and the second communication technology (e.g., cellular communication technology). In some embodiments, the method 650 may further include utilizing a NOMA in providing the outputs to the first network device and the second network device, as described in connection with FIG. 4.

In a number of embodiments, at least one of the first communication technology and the second communication technology may be 5G technology or later technology and operate in a number of frequency bands including the UHF, SHF, EHF, and/or THF bands, as described in connection with FIG. 2. The memory, transceiver, and/or the processor may be a resource that can be wirelessly utilizable by the first network device and/or the second network device via respective communication technologies such as 5G technology or later technology.

In the above detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically for access to and/or for movement (transmission) of instructions (e.g., control signals, address signals, etc.) and data, as appropriate to the context. The terms "data" and "data values" are used interchangeably herein and may have the same meaning, as appropriate to the context (e.g., one or more data units or "bits").

While example embodiments including various combinations and configurations of memory resources, processors, transceivers, memory devices, controllers, base stations, infrastructure, and switches, among other components for remotely executable instructions have been illustrated and described herein, embodiments of the present disclosure are not limited to those combinations explicitly recited herein. Other combinations and configurations of the memory resources, processors, transceivers, memory devices, controllers, base stations, infrastructure, and switches for remotely executable instructions between selected memory resources disclosed herein are expressly included within the scope of this disclosure.

Although specific embodiments have been illustrated and described herein, those of ordinary skill in the art will appreciate that an arrangement calculated to achieve the same results may be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a memory device including:
  a processor including a number of logic units; and
  a memory storing instructions executable by the processor;
 wherein the processor, by executing the instructions stored in the memory, is configured to wirelessly communicate with a user device via a cellular telecommunication to operate, using the number of logic units, as a remote expansion card for the user device;
 wherein the processor is further configured to communicate, via the cellular telecommunication, data within a licensed frequency band; and
 wherein data stored in the remote expansion card and to be accessed by the user device are directly communicated between the remote expansion card and the user device without transferring through the base station.

2. The apparatus of claim 1, wherein the expansion card communicates, via the cellular telecommunication, with the user device on time and frequency resources scheduled via downlink control signaling from a base station.

3. The apparatus of claim 1, wherein:
 the processor, by executing the instructions stored in the memory, is configured to communicate, via the cellular telecommunication, data within a licensed frequency band; and
 the data communicated between the remote expansion card and the user device via the cellular telecommunication are indirectly communicated through the base station.

4. The apparatus of claim 1, wherein one or more of the number of logic units is an arithmetic logic unit (ALU).

5. The apparatus of claim 1, wherein one or more of the number of logic units is a graphics processing unit (GPU).

6. The apparatus of claim 1, one or more of the number of logic units is a floating point unit (FPU).

7. A system, comprising:
a user device; and
a memory device to operate as a remote expansion card for the user data and comprising:
a processor comprising a plurality of logic units; and
a memory storing instructions executable by the processor;
wherein the processor, by executing the instructions stored in the memory, is configured to:
execute, in response to receipt of a request from the user device, a plurality of sets of instructions using the plurality of sets of logic units, wherein each of the plurality of sets of logic units is aligned in parallel with others of the plurality of sets of logic units; and
transmit, to the user device, outputs obtained as a result of the execution via a cellular telecommunication within a licensed frequency band;
wherein the processor is further configured to:
convert a video signal having a first format to a video signal having a second format; and
transmit the video signal having the converted second format to the user device via the cellular telecommunication within the licensed frequency band.

8. The system of claim 7, wherein the processor, by executing the instructions stored in the memory, is configured to transmit, via the cellular telecommunication, the outputs to the user device on a sidelink within the licensed frequency band on time and frequency resources scheduled via downlink control signaling from a base station.

9. The system of claim 7, wherein the memory device is a video card wirelessly coupled to the user device.

10. The system of claim 7, wherein:
the video signal having the first format corresponds to one of a digital video signal or an analog video signal; and
the video signal having the second format corresponds to another one of the digital video signal or the analog video signal.

11. The apparatus of claim 7, wherein the memory device comprises a synchronous graphics random access memory (SGRAM), high bandwidth memory (HBM), or hybrid memory cube (HMC), or any combination thereof.

12. A system, comprising:
a plurality of user devices; and
a memory device comprising a processing resource and wirelessly coupled to the plurality of user devices, the memory device configured to:
perform, in response to receipt of a request from one or more of the plurality of user devices, one of video encoding process or video decoding process; and
transmit a resulting signal of the performed one of video encoding process or video decoding process via a cellular telecommunication within a licensed frequency band on time and frequency resources scheduled via downlink control signaling from a base station.

13. The system of claim 12, wherein the memory device is configured to transmit, via the cellular telecommunication, the resulting signal to the user device on a sidelink within the licensed frequency band on time and frequency resources scheduled via downlink control signaling from the base station.

14. The system of claim 12, wherein the resulting signal comprises a compressed or uncompressed video signal, a compressed or uncompressed audio signal, or analog video signal, or any combination thereof.

15. The system of claim 12, wherein the memory device is configured to:
transmit, via the cellular telecommunication, the resulting signal directly to a first user device of the plurality of user devices; and
transmit, via the cellular telecommunication, the resulting signal indirectly to a second user device of the plurality of user devices;
wherein a same user protocol is utilized in communicating with the first user device and the second user device.

16. The system of claim 15, wherein the network protocol includes a non-orthogonal multiple access (NOMA) protocol.

17. The system of claim 12, wherein the memory device is configured to transmit the resulting signal on frequency resources of a channel bandwidth equal to or greater than 50 megahertz (MHz).

18. The system of claim 12, wherein the memory device is configured to utilize the cellular telecommunication for an enhanced mobile broadband (eMBB), massive machine-type communications (mMTC), or ultra-reliable and low-latency communications (URLLC), or any combination thereof.

* * * * *